United States Patent

Spacek

[15] 3,638,126

[45] Jan. 25, 1972

[54] HIGH-FREQUENCY CONVERTER

[72] Inventor: George Ctirad Spacek, 967 La Senda Road, Santa Barbara, Calif. 93015

[22] Filed: Aug. 21, 1969

[21] Appl. No.: 851,923

[52] U.S. Cl. ..................................325/446, 321/69, 325/449

[51] Int. Cl. ..........................................................H03d 7/02

[58] Field of Search ..................325/137, 138, 445, 446, 449, 325/450; 332/44, 45, 47–49, 54, 55; 333/4, 5, 6, 9, 10, 11, 24; 321/69 R, 69 W, 69 NL; 307/88.3

[56] References Cited

UNITED STATES PATENTS

| | | | |
|---|---|---|---|
| 2,514,678 | 7/1950 | Southworth | 332/54 |
| 2,561,417 | 7/1951 | Ryan et al. | 325/445 |
| 2,943,192 | 6/1960 | Liss | 325/446 |
| 3,512,090 | 5/1970 | Mouw | 325/442 |

*Primary Examiner*—Benedict V. Safourek

[57] ABSTRACT

This invention relates to a balanced high-frequency converter for mixing of microwave signals over large bandwidth. The essential characteristics of this invention is the placement of a pair of semiconductor diodes at the intersection of a waveguide with one coaxial line in such manner that the broad walls of the waveguide are utilized as the continuation of the outer conductor of the coaxial line. Thus the waveguide does not cause an impedance mismatch for signals propagating on the coaxial line, allowing coupling of wideband signals into the diodes. The resulting beat frequency signal is extracted through the waveguide. An extension of the above principle allows the construction of a doubly balanced frequency converter, in which two pairs of semiconductor diodes are placed across the waveguide and in which one coaxial line couples signals to one pair of diodes and a second coaxial line couples signals to the second pair of diodes. The broad walls of the waveguide are utilized as continuation of the outer conductors of the coaxial lines, thereby eliminating impedance mismatch and allowing efficient frequency conversion over a broad frequency range.

7 Claims, 6 Drawing Figures

HIGH-FREQUENCY CONVERTER

Figure 1:
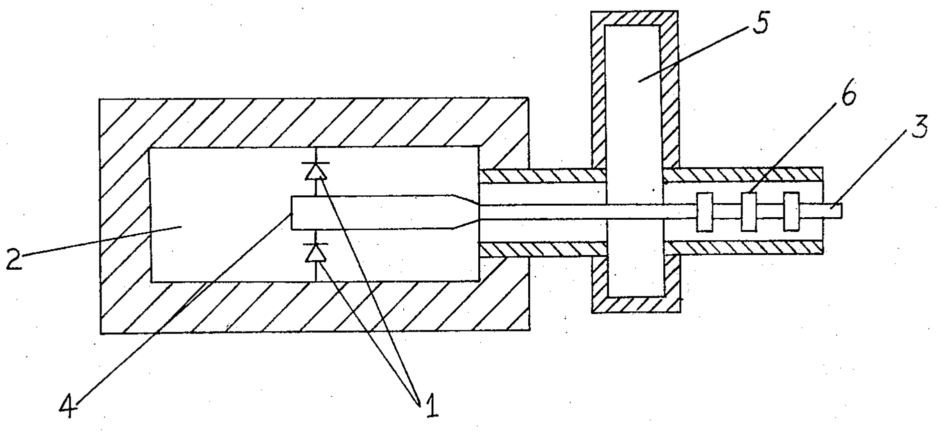

This invention relates in general to frequency converters and more particularly to high-frequency converters employing semiconductor diodes in a balanced configuration. Balanced frequency converters are usually employed in superheterodyne microwave receivers, for which the signal frequency is so high that amplification at the signal frequency is technically or economically not feasible. The frequency converter changes the signal frequency to an intermediate frequency, which carries the same information as the signal, but is at a much lower frequency, at which amplification is technically and economically feasible. For many applications the information bandwidth is narrow and consequently the bandwidth of the frequency converter does not have to be wide. For this purpose, balanced frequency converters are existing which consist of a pair of semiconductor diodes placed on the opposite arms of a microwave hybrid junction, commonly referred to as hybrid Tee. The distance between the two diodes in the hybrid Tee is large relative to the wavelength of the signal and intermediate frequency and consequently the bandwidth of a frequency converter with hybrid Tee is narrow. This is so because the long length of transmission lines connecting the two diodes acts as additional reactance, which narrows down the bandwidth of the conventional hybrid Tee frequency converter. This effect is even more enhanced by the fact that the impedance of semiconductor diodes varies with frequency, such that the transmission lines connecting the two diodes can not be matched in impedance to the diodes over a large bandwidth. As is generally known, a transmission line connected to a mismatched load will act as an impedance transformer, the transformation effect of which is the larger, the longer is the transmission line in terms of wavelengths. For transmission line length negligible to wavelength no transformation effect exists, while for a transmission line length equal to multiples of quarter wavelength maximum impedance transformation will result. Thus if signal frequency or intermediate frequency is so high that the length of the transmission lines connecting the two diodes in a conventional, hybrid Tee frequency converter approaches one quarter wavelength, it is not possible to obtain good conversion efficiency over a wide band of frequencies, because the impedance of the transmission lines will vary with respect to frequency. An additional disadvantage of presently existing balanced frequency converters with hybrid Tee is that the hybrid Tee itself has limited bandwidth, especially at frequencies above about 8 GHz., at which frequencies waveguide transmission lines, rather than coaxial or stripline transmission lines, are used to manufacture the hybrid Tee. The waveguide hybrid Tee of a conventional frequency converter is so constructed that one common section of the hybrid Tee carries two signals, the RF input signal and the local oscillator signal. Now, a waveguide transmission line has an inherent bandwidth limitation, which is determined by the width of the waveguide. If the wavelength of a signal is larger than twice the width of the waveguide, such a signal will not propagate through the waveguide. If, on the other hand, the wavelength of the signal is less than the width of the waveguide, the propagation of the signal through the waveguide will result in a mode of propagation in which the intensity of electrical field in the longitudinal center of the waveguide is minimum. Consequently, a wave can not be launched into the waveguide if the launching probe is in the center of the waveguide. However, for propagation in the dominant waveguide mode, for which the intensity of the electric field is maximum in the center of the waveguide, it is necessary that the launching probe be located in the longitudinal center of the waveguide. In a conventional frequency converter employing waveguide hybrids, the launching probes are semiconductor diodes, which for operation in the dominant waveguide mode must be located in the longitudinal center of the waveguide. Under this condition the bandwidth of the frequency converter is at most an octave, because for signals with wavelengths more than twice the width of the waveguide the RF input signal and the local oscillator signal will not propagate through the waveguide, and for signals with wavelengths less than the width of the waveguide, second mode of waveguide propagation will result, in which the electric field intensity at the location of the semiconductor diodes is nearly zero, which prevents coupling of electromagnetic energy into the diodes.

Applications exist for which the frequency separation between the RF signal and the local oscillator signal is more than 2 to 1. For such application conventional balanced frequency converter with waveguide hybrid Tee is not suitable for reasons outlined above.

It is an object of this invention to provide a novel type of frequency converter, in which the bandwidth limitations of a conventional, hybrid Tee frequency converter are avoided by placing the semiconductor diodes immediately next to each other. It is another object of this invention to provide a wideband frequency converter in which one transmission line propagating in the TEM mode is used to couple two signals into or from the diodes, and one transmission line propagating in the waveguide mode serves to couple third signal to or from the diodes, thus eliminating bandwidth limitations of a conventional frequency converter employing waveguide hybrid Tee.

The applicant filed on Sept. 18, 1967, patent application Ser. No. 668,718, for a balanced frequency converter resembling the balanced frequency converter specified in this application. Although the frequency converter of patent application Ser. No. 668,718, provides larger bandwidth than a conventional balanced converter with hybrid Tees, it will not function for certain frequency relationships of the input and output signals. This limitation is caused by the fact that signals are coupled to the diodes by two TEM transmission lines, one for the RF input and one for local oscillator signal. These two transmission lines are on opposite sides of the diodes, decoupled from each other by filters, which prevent dissipation of RF input energy in the source resistance of local oscillator and vice versa. The reflected impedance of these filters can for certain frequencies represent a short circuit at the RF input frequency in the plane of the diodes, thus preventing coupling of the RF energy into the diodes. This limitation is removed in the frequency converter of the present application by coupling two signals into the diodes only from one side of the diodes by one common TEM transmission line. The transmission line past the diodes does not conduct high-frequency energy, although it may be used to provide DC-bias as well as DC-short for the diodes, if required. Since the TEM transmission line is at least high-frequencywise, discontinued essentially in the plane of the diodes, the reflected impedance of the transmission line will be infinite, thus assuring coupling of RF input and local oscillator signals into the diodes at all frequencies. It is not essential to the invention whether the TEM transmission line is physically discontinued past the diodes, although this is preferred. If DC current monitoring for the diodes is required, the TEM transmission line would be continued typically quarter-wavelength past the diodes, and then high-frequencywise short circuited to ground. This would provide high-frequencywise an open circuit in the plane of the diodes, while allowing the diode DC current to pass to the current monitoring device. It is not essential to the invention whether the common TEM transmission line couples two signals into the diodes, or couples one signal into the diodes and extracts one signal from the diodes, as this depends on whether the converter is used for upconversion or downconversion.

The present invention of balanced frequency converter includes two separate transmission lines, a waveguide transmission line and a TEM transmission line. The waveguide transmission line is used to couple one signal to or from the diodes, while the TEM transmission line couples two additional signals at different frequencies to or from the diodes. The wave paths provided by each of these structures meet at a common point in such a manner that neither of the signals to be mixed will be dissipated in the source or load resistance of the transmission lines provided for the other signals. The two semiconductor diodes are placed at the location at which the said structures meet thus allowing coupling of RF input and local oscillator signals into the diodes and extracting intermediate frequency signals out of the semiconductor diodes. Mixing of the signals is accomplished by periodical resistance variation of the diodes as caused by the local oscillator voltage. The semiconductor diodes can also be of the variable reactance variety, commonly referred to as varactor diodes.

The respective polarity of the semiconductor diodes is such that two signals propagating in the TEM transmission line excite each diode with 180° phase difference, while the third signal, propagating in the waveguide, excites both diodes in phase. The 180° phase difference of signals propagating in the TEM transmission line prevents these signals from propagating in the waveguide and vice versa.

Since both semiconductor diodes are located immediately next to each other, no additional transmission lines are required to combine the intermediate frequency signal emerging from the diodes. This characteristic is primarily responsible for the large bandwidth and low conversion loss obtainable even at very high intermediate frequencies. The TEM transmission line, used to couple two signals into or out of the diodes, has no bandwidth limitation, allowing any frequency separation of the two signals.

An extension of the principle described above allows the construction of a doubly balanced frequency converter, commonly referred to as ring modulator, with smaller dimensions and larger bandwidth than ring modulators of present art.

A ring modulator, which employs four semiconductor diodes, provides larger suppression of certain spurious responses than a balanced mixer with only two diodes. Conventional high-frequency ring modulator consists of four hybrid Tees and one power combiner. Two hybrid Tees constitute two balanced mixers, one additional hybrid Tee serves to divide the RF input signal between the two balanced mixers and one additional hybrid Tee serves to divide the local oscillator signal between the two balanced mixers. The power combiner is used to combine the intermediate frequency signals emerging from the four diodes. Because of the large number of hybrid Tees employed, a conventional high-frequency ring modulator is large and heavy. Moreover, because of the inherent bandwidth limitations of the hybrid Tees and because of the large dimensional separation of the four diodes, the bandwidth of a conventional high-frequency ring modulator is narrow.

It is another object of this invention to provide a smaller, wideband, doubly balanced frequency converter which reduces the size and eliminates the bandwidth limitations of a conventional doubly balanced frequency converter with waveguide hybrid Tees, by placing four diodes immediately next to each other at the intersection of two TEM transmission lines and one waveguide transmission line.

The ring modulator of this application consists of four diodes, placed immediately next to each other at the intersection of a waveguide transmission line and of two transmission lines propagating in the TEM mode. The energy propagating in the waveguide excites one diode pair with 180° phase difference with respect to the other diode pair. The energy propagating in the first TEM transmission line excites another pair of diodes with 180° phase difference with respect to another pair of diodes. The diode pairs excited by the waveguide are different from the diode pairs excited by the first TEM transmission line and the diode arrangement is such that the signals generated in the four diodes are all in phase with respect to the second TEM transmission line. Thus no power combiner is needed to extract the signals emerging from the four diodes. This characteristic is primarily responsible for large bandwidth and small size of the ring modulator of this application.

A modification of the ring modulator invention outlined above allows the construction of a doubly balanced frequency converter in which one of the sidebands is suppressed. Such frequency converters are in general called single-sideband modulators if the output frequency is not too different from one of the input frequencies or image-rejection mixers, if the output frequency is much lower than the input frequencies. Both devices are identical, the difference being in the application of signals by the user.

Image-rejection mixers or single-sideband modulators of present art consist of two balanced mixers, mutually connected by hybrid Tees and phase shifters. The output signal from one mixer must be combined with the output signal of the other mixer by a signal combiner network. Because of the separation of the two balanced mixers, single-sideband modulators are large and the bandwidth obtainable is narrow.

It is an object of this invention to provide an image-reject mixer, also called single-sideband modulator, of small size and large bandwidth, in which the semiconductor diodes are placed immediately next to each other, thus eliminating a separate network for combining of the signal emerging from the diodes. The image-reject mixer invention comprises: four diodes placed essentially in the center of a waveguide, which serves to conduct first signal to or from the diodes; first and second TEM transmission lines, extending outwardly from the opposite sides of the waveguide, which serve to couple or extract a second signal at different frequencies to or from the diodes, the axis of the two TEM transmission lines being essentially perpendicular to the axis of the electric field vector in the waveguide. The first and second TEM transmission lines are connected inside of the waveguide with the third and fourth TEM transmission lines, essentially at the same location at which semiconductor diodes are connected between the top and bottom of the waveguide and the four TEM transmission lines. The first and second TEM transmission lines are joined outside of the waveguide through a phase shifter, which introduces 90° phase shift between these two transmission lines in the place of the diodes. Similarly, the third and fourth TEM transmission lines are joined outside of the waveguide through a phase shifter which introduces 90° phase shift between these two transmission lines in the plane of the diodes.

Since the four TEM transmission lines inside of the waveguide are perpendicular to its electric field vector, the signal propagating on the TEM transmission lines are isolated from signals propagating in the waveguide and vice versa.

Other features and objects of the invention will be apparent from the following specific descriptions of embodiments taken in conjunction with the figures in which:

FIG. 1: illustrates a front sectional view of the balanced frequency converter.

Figure 2:
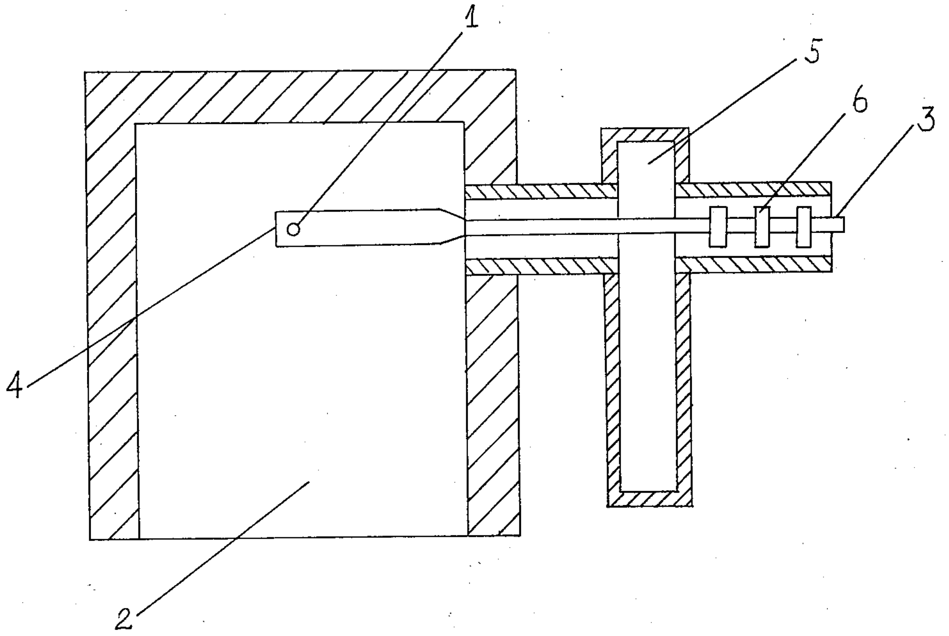

FIG. 2: illustrates a top view of the balanced frequency converter.

Figure 3:
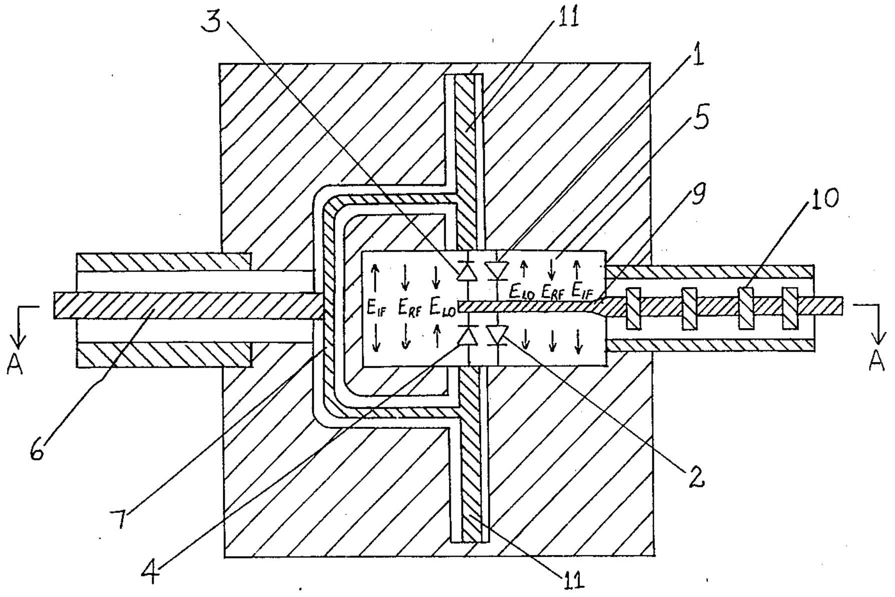

FIG. 3: illustrates a front sectional view of the ringmodulator.

Figure 4:
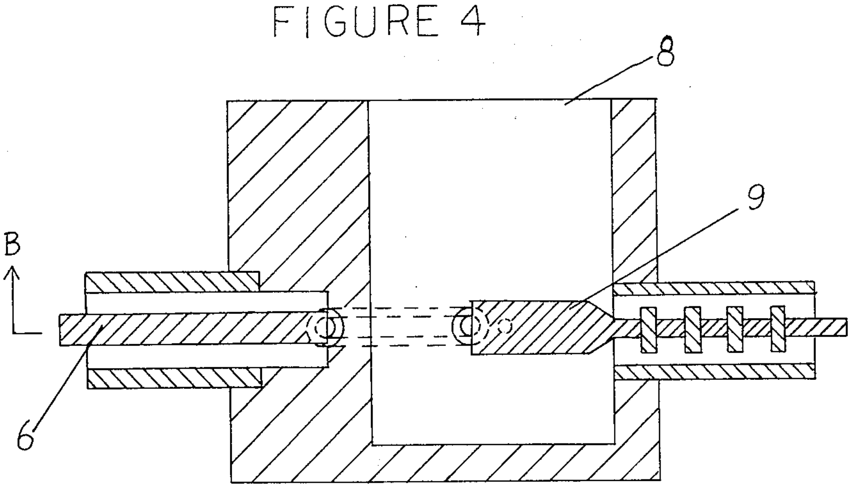

FIG. 4: illustrates a top sectional view of the ringmodulator.

Figure 5:
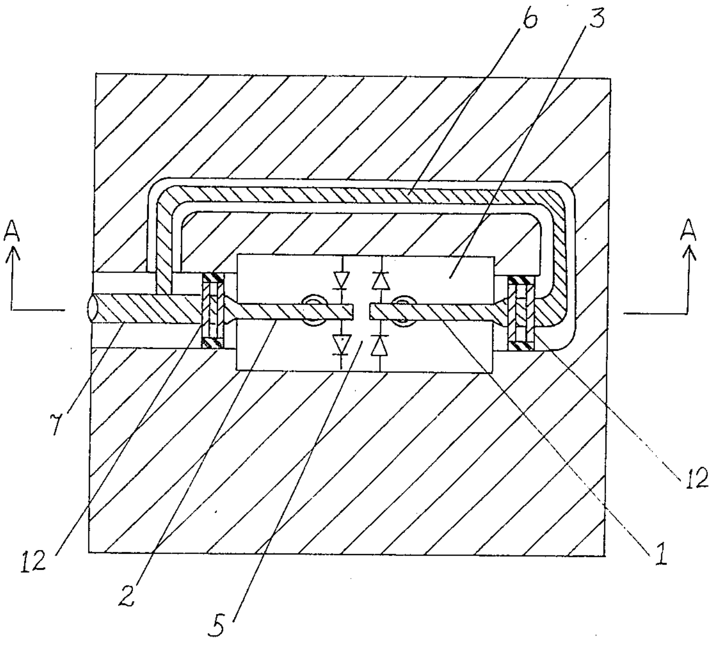

FIG. 5: illustrates a front sectional view of the image-reject mixer.

Figure 6:
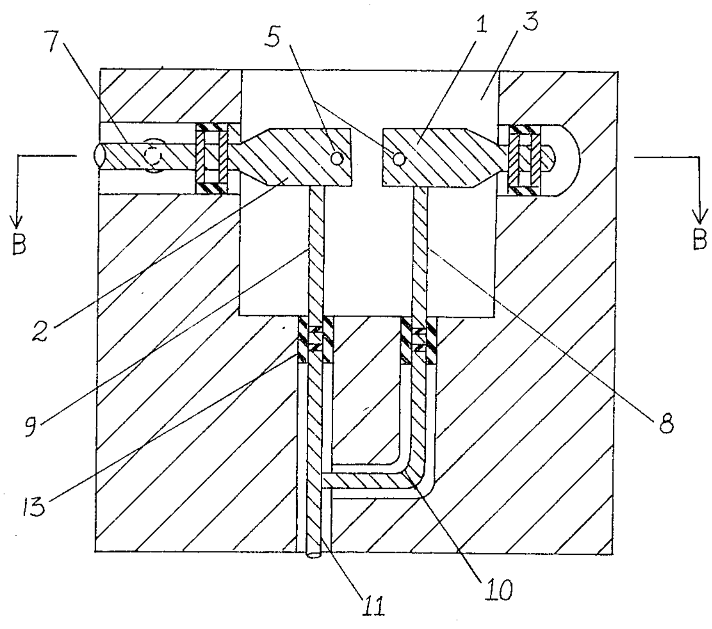

FIG. 6: illustrates a top sectional view of the image-reject mixer.

With reference to the balanced frequency converter, FIG. 1 and 2 illustrate an embodiment of the invention including semiconductor diodes for mixing of two signals, which for convenience, will be hereinafter referred to as RF signal and L.O. signal to produce a third signal referred to as IF signal. Although the abbreviation IF signal implies a frequency intermediate between the RF and L.O. signals, for the purpose of this invention an IF signal might be equal to the difference of the frequencies of the RF and L.O. signals (commonly called lower sideband), but it might also be equal to the sum of the frequencies of the RF and L.O. signals (commonly called upper sideband). In this case, the IF signal will be at a frequency higher than either the RF or L.O. signal.

It is not essential to this invention which of the transmission lines serve to couple signals into the diodes and extract signals from the diodes; this depends solely on the relative frequencies of the input and output signals. For example, if the intermediate frequency is higher than either the RF and L.O. signal, it might be convenient to extract the IF signals through the waveguide transmission line and to couple the RF and L.O. signals into the diodes with the TEM transmission line. If the frequency of the IF signal is below the frequencies of the RF and L.O. signals, it might be more convenient to use the TEM transmission for coupling of one input signal into the diodes as well as for extracting of the IF signal out of the diodes, and to use the waveguide transmission line for coupling of the other input signal into the diodes.

Although the assignment of the input and output signals to the two transmission lines is not essential to the invention for reasons outlined above, for the sake of clarity, the functioning of the frequency converter will be explained with reference to FIG. 1 and FIG. 2 under the assumption that the converter is used for upconversion and that the intermediate frequency signal is extracted from the diodes by waveguide transmission line.

With reference to FIG. 1 and FIG. 2, a pair of semiconductor diodes 1 is placed within a waveguide 2, which serves to extract the IF signal emerging from each diode and transmit it to an IF amplifier, which can be thought of as being connected to the waveguide between the observer and the illustration. The IF signal is generated in the semiconductor diodes through interaction of the L.O. and RF signals, the mechanism being nonlinear characteristics of the diodes with respect to the L.O. signal amplitude. The source of L.O. signal energy is connected at point 3 to a TEM transmission line 4, which serves to couple the L.O. voltage to the diodes.

A source of the RF signal is simultaneously coupled to the said TEM transmission line. For this purpose, the said TEM transmission line passes through a waveguide 5, to which the source of the RF signal energy is connected and can be thought of as being located between the illustration and the observer. The said waveguide 5 induces the RF signal voltage in the TEM transmission line 4, which in turn couples the RF signal voltage into the diodes. The TEM transmission line 4 thus is in essence connected in parallel to the source of RF signal and L.O. signal voltage. The TEM transmission line 4 is discontinued just past the diodes. Thus no matter what are the frequencies of the RF and L.O. signals the RF and L.O. signal voltages will couple into the diodes because the TEM transmission line is physically discontinued past the diodes and the reflected impedance of the TEM transmission line 4 will be infinite in the plane of the diodes at all frequencies. The RF signal and L.O. signal energy cannot propagate into waveguide 2, because the said TEM transmission line is perpendicular to the electric field vector of waveguide 2.

The waveguide 5 is not essential to the invention as it merely serves to induce the RF signal voltage into the TEM transmission line, while at the same time preventing the L.O. signal voltage from dissipating in the resistance of the RF signal source. Waveguide 5 thus serves merely as a filter and can be replaced by any other filter structure; if the source of the RF energy has an infinite impedance at the frequency of the L.O. signal, waveguide 5 can be omitted. A filter 6 is inserted between the source of the RF energy and the source of L.O. energy. The filter 6 passes the L.O. energy but prevents the RF energy from dissipating in the source resistance of the local oscillator. If the resistance of the L.O. signal source is infinite at the RF frequency, filter 6 can be omitted.

The balanced frequency converter described above can also be used for frequency multiplication by connecting only one source of high-frequency energy to the TEM transmission line 4, and by extracting the higher harmonic frequencies through waveguide 2. The improvement of this invention in frequency multiplier application results in larger bandwidth than that of frequency multipliers of present art. The reason is that frequency multipliers of present art must use filters to isolate the source of high-frequency energy from the load resistance of the higher harmonics signals utilization device. These filters tend to narrow the bandwidth of frequency multipliers of present art. The balanced frequency converter of this invention, when used as frequency multiplier, does not require filters to isolate the input circuit from the output circuit, as the TEM transmission line 4 is perpendicular to the electric field vector propagating in waveguide 2 and thus signals propagating on these two transmission lines will be inherently isolated from each other. The elimination of filters results in larger bandwidth and smaller size than obtainable with frequency multipliers of present art.

This concludes the description of a balanced frequency converter incorporating features of the invention in which one waveguide transmission line and one TEM transmission cross, in which semiconductor diodes are connected to the two transmission lines at the crossing point, and in which the TEM transmission line penetrates substantially one-half of the waveguide width.

With reference to the ringmodulator, its functioning will be explained with reference to FIG. 3 and FIG. 4 under the assumption that the local oscillator signal is applied through the first TEM transmission line, the RF input signal is applied through the waveguide transmission line and the intermediate frequency signal is extracted by the second TEM transmission line. This arrangement would be typical for operation of the ring modulator as downconverter, with the RF signal frequency higher than the local oscillator frequency. The specific frequencies are assigned to the various transmission lines only for the sake of clarity, as it is not essential to the invention which of the three transmission lines couple signals into the diodes and which lines extract the signals from the diodes.

FIG. 3 and 4 illustrate an embodiment of the invention including semiconductor diodes for mixing of two signals, which, for convenience, will be hereinafter referred to as RF signal and L.O. signal to produce a third signal referred to as IF signal. Although the abbreviation IF signal implies a frequency intermediate between the RF and L.O. signals, for the purpose of this invention an IF signal might be equal to the difference of the frequencies of the RF and L.O. signals (commonly called lower sideband), but it might also be equal to the sum of the frequencies of the RF and L.O. signals (commonly called upper sideband). In this case, the IF signal will be at a frequency higher than either the RF or L.O. signal. For applications in which the ringmodulator is used for amplitude modulation, the L.O. signal would be equivalent to the carrier, the IF signal would not be extracted but applied to the diodes as the modulating signal, and the RF signal would not be applied, but would be extracted from the diodes as the modulated carrier sidebands. Since the ringmodulator invention is fully reciprocal, it is without significance for the functioning of the ringmodulator which transmission lines are used for coupling of two input signals and which transmission line is used for the extraction of the output signals resulting from interaction of the two input signals.

As shown in FIG. 3 and FIG. 4, four semiconductor diodes 1, 2, 3, and 4, are symmetrically located in the center of a waveguide 5, to which a source of RF energy is connected via waveguide flange 8. The electric field in waveguide 5 is parallel with the axis of the four diodes, such that the Rf signal voltage is induced in all four diodes. However, the polarity of the diodes shown in FIG. 3, is such that for the positive half of the RF cycle, diodes 1 and 2 are conducting while diodes 3 and 4 are not.

In addition to the RF signal voltage, local oscillator voltage is coupled into the diodes. This is accomplished by connecting a source of local oscillator voltage to a TEM transmission line 6. The said TEM transmission line is split into two branches 7, which constitute a power divider. Diodes 3 and 4 are connected to the end of the power divider. Since the power divider is symmetrical, the local oscillator voltages in each branch are equal and no local oscillator voltage gradient can develop across diodes 3 and 4. Additionally, because of the symmetry of the local oscillator coupling network, the local oscillator energy can not propagate in waveguide 5. However, diodes 1 and 2 are grounded and consequently they represent return path for the local oscillator voltage. The local oscillator voltage will thus appear across diode pair 1, 4 and across diode pair 2, 3. Thus the polarity of the RF signal and local oscillator voltage with respect to the four diodes are as follows: At diode 1, the RF and L.O. voltages are 180° out of phase; at diode 2, the RF and L.O. voltages are in phase and point in the direction of the diode polarity; at diode 3, the RF and L.O. voltages are in phase and point against the direction of the diode polarity; at diode 4, the RF and L.O. voltages are out of phase. It can be shown mathematically that an intermediate frequency signal, resulting from mixing of RF and L.O. signal in a semiconductor diode, will have the same polarity as the diode polarity if the RF and L.O. signals are in phase, and a polarity opposite to the diode polarity if the RF and L.O. signals are out of phase. Thus the IF signal emerging from diode 1 will point against the diode direction, at diode 2 it will point with the diode direction, at diode 3 it will point with the diode direction, at diode 4 it will point against the diode direction. The relative orientations of the RF, L.O. and IF signals across each diode is represented in FIG. 3 with the arrows designated $E_{RF}$, $E_{LO}$, and $E_{IF}$. These arrows symbolize the electric field vectors at the respective signals. All IF signals emerging from the four diodes are therefore in phase. This allows the use of a single TEM transmission line 9 for extraction of the intermediate frequency signal. The TEM transmission line 9 is flattened inside of the waveguide to provide proper impedance matching. The flattened portion of the TEM transmission line 9 constitutes, together with the top and bottom walls of waveguide 5, a stripline transmission line of the same impedance as the impedance of the IF utilization device. The TEM transmission line 9 is perpendicular to the electric field vector in waveguide 5. Coupling of energy from waveguide 5 into TEM transmission line 9 or vice versa is therefore not possible, provided that the four diodes are electrically identical. To prevent coupling of waveguide energy into the TEM transmission line 9 in the case that the diodes are not identical, a filter 10 is inserted in series with the TEM transmission line. The said filter passes the IF signal, but reflects the RF and L.O. signals. To provide electrical ground at the RF signal frequency for diodes 3 and 4, transmission line stubs 11 are incorporated into the ring modulator structure. The length of these stubs is such that they represent a short circuit at the RF signal frequency, but an open circuit at the L.O. frequency. This is accomplished typically by making the length of the stub ½ wavelength long at the RF signal frequency and by connecting the branches of the power divider 7 ¼ wavelength away at the L.O. frequency from the grounded end of the stubs. This concludes the description of a doubly balanced frequency converter, commonly referred to as ring modulator, incorporating features of the invention in which three transmission lines conducting separate signals cross at a common point, and in which four semiconductor diodes are located at the common crossing point. The first transmission line is a waveguide, the electric field vector of which is perpendicular to the axis of a second transmission line propagating in the TEM mode, and parallel to the axis of a third transmission line propagating in the TEM mode. The axis of the four semiconductor diodes are essentially parallel with the electric field vector of the waveguide transmission line. The excitation of the one TEM transmission line is such that its voltage propagation is unbalanced with respect to ground while the excitation of the other TEM transmission line is such that its voltage is balanced with respect to ground. Two of the transmission lines serve to couple signals at different frequencies to the semiconductor diodes and one transmission line serves to extract the resulting signal at the sideband frequency from the semiconductors diodes. The orientation of the semiconductor diodes is such that signals applied to any two of the transmission lines will produce through interaction of the two signals in the diodes a third signal at the sideband frequency, which excites the third transmission line in the proper phase and assures extraction of the sideband frequency signal by the third transmission line, while at the same time preventing coupling of the sideband frequency signal in the first and second transmission line.

The characteristics of the image-rejection invention will be explained with reference to FIG. 5 and FIG. 6, in which:

FIG. 5 illustrates a front sectional view of the image-reject mixer including features of the invention. FIG. 6 illustrates a top sectional view of the image-reject mixer. FIGS. 5 and 6 illustrate an embodiment of the invention including semiconductor diodes for mixing of two input signals which, for convenience, will be hereinafter referred to as RF signal and L.O. signal to produce an output signal referred to as IF signal, the frequency of the IF signal being the sideband frequency of the RF and L.O. signals. The nomenclature RF, L.O. and IF signal is used only for convenience and does not restrict the applicability of the invention for single-sideband modulation, in which case the three signals would more appropriately be called carrier, modulation input and modulated output.

As shown in FIG. 5, a TEM transmission line 1 and another TEM transmission line 2 cross a waveguide 3 in such a manner that the electric field vector of the waveguide is perpendicular to the axis of the said TEM transmission lines. The inside conductors of the said TEM transmission lines are insulated from the walls of the waveguide, and each extends inwardly from the sides of the waveguide and are discontinued essentially in the center of the waveguide. The top and bottom walls of the waveguide serve as the outer conductors of the said TEM transmission lines. At least four semiconductor diodes 5 are connected to the inside conductors of the said TEM transmission lines near the location at which the center conductors of the said TEM transmission lines are discontinued. The opposite ends of the semiconductor diodes are connected to the top and bottom wall of the said waveguide. The inside conductors of the said TEM transmission lines are joined outside of the waveguide through a phase shifter 6, which introduces 90° phase shift differential between TEM transmission lines 1 and 2 at the location of the semiconductor diodes. The joined ends of the TEM transmission lines 1 and 2 are connected to a TEM transmission line 7, to which an IF signal utilization device is connected. As shown in FIG. 6, two additional TEM transmission lines 8 and 9 are connected to the center conductors of TEM transmission lines 1 and 2 essentially at the same location at which the semiconductor diodes 5 are connected. The center conductors of the two additional TEM transmission lines 8 and 9 extend from a sidewall of the waveguide 3 and are essentially perpendicular to the electric field vector of the said waveguide. The top and bottom walls of the said waveguide serve as the continuation of the outer conductors of TEM transmission lines 8 and 9 in the area of penetration of the center conductors of the TEM transmission lines 8 and 9 into the said waveguide.

The center conductors of the transmission lines 8 and 9 are joined outside of the said waveguide through a phase shifter 10, which introduces 90° phase differential between TEM transmission lines 8 and 9 at the location of the semiconductor diodes.

The joined ends of the TEM transmission lines 8 and 9 are connected to a TEM transmission line 11, to which a source of L.O. voltage is connected.

The functioning of the image-rejection mixer invention is as follows: an RF signal coupled to waveguide 3 will introduce RF voltage in phase in all semiconductor diodes. However, as shown, the polarity of the diodes is such that only one-half of the diodes will be conducting at a time. An L.O. signal, coupled into the semiconductor diodes through TEM transmission lines 11, 10, and 9 excites one half of the diodes with 90° phase difference with respect to the other half of the diodes. The resulting signal, generated by the interaction of the RF and L.O. signal voltages in the semiconductor diodes, is extracted from the diodes through TEM transmission lines 1 and 2. Because the RF signal excites all diodes in phase, and the L.O. signal excites one half of the diodes with 90° phase differential with respect to the other half of the diodes, the resulting IF signals emerging from the two diodes groups will also have 90° phase differential. However, the 90° phase differential is phase lead if the L.O. signal frequency is above the RF signal frequency and phase lag if the L.O. signal frequency is below the RF signal frequency. Since the phase shifter 6 introduces additional 90° phase lag between the IF signals emerging from one half of the diodes, with respect to the phase of IF signals emerging from the other half of the diodes, for L.O. signal frequency higher than RF signal frequency, the two IF signals propagating on the TEM transmission lines 1 and 2 will be in phase at the point at which these transmission lines are joined to transmission line 7. Consequently, IF voltage will exist across the center and outer conductor of TEM transmission line 7 and can be utilized by the IF utilization devices. If the L.O. signal frequency is higher than RF signal frequency, the 90° phase lag introduced by phase shifter 6 will enhance the 90° phase lag between the IF signals emerging from the two diode groups, resulting in 180° phase differential at a point at which transmission lines 1 and 2 are joined to transmission line 7. Consequently, no IF voltage potential will exist between the center and outer conductor of transmission line 7. In addition to the essential elements of the invention described above, frequency filters 12 and 13 are inserted in series with TEM transmission lines 1, 2, 8 and 9. Filters 12 pass the IF signal, but reject the L.O. signal. Filters 13 pass the L.O. signal, but reject the IF signals.

Although for convenience in the above description of the invention, specific signals were assigned to the various transmission lines, it is not essential to the invention which of the transmission lines are used to couple signals into the diodes and which are used to extract signals from the diodes, as proper phasing and cancellation of one sideband is obtained even if the coupling and extracting functions of the various transmission lines are interchanged.

What is claimed is:

1. A microwave frequency converter comprising; a rectangular waveguide through which a first radiofrequency wave may be propagated, said waveguide having first and second opposite pairs of walls, with said first pair of walls being narrower than said second pair of walls; a coaxial transmission line consisting of an inner conductor and of an outer conductor, said outer conductor mounted upon and extending outwardly from one of the said first pair of walls; a conducting member, said member extending essentially halfway through the interior of the said waveguide and joining the said inner conductor through an aperture in the narrow wall of the said waveguide; a pair of semiconductor diodes mounted on opposite sides of said member and electrically coupled between said opposite sides of said member and respective ones of said second pair of waveguide walls; means applying a second radiofrequency wave to said coaxial transmission line, said coaxial transmission line transmitting said second radiofrequency wave to said member; and a further wave conducting means coupled simultaneously to said coaxial transmission line, said further wave conducting means extracting radio frequency signals at the sideband frequency generated by the interaction of the said first and second radiofrequency wave in the said pair of semiconductor diodes.

2. A frequency converter as set forth in claim 1, wherein said conducting member is in the form of a flat plate so that said conducting member and said second pair of waveguide walls form a strip transmission line.

3. A frequency converter as set forth in claim 1, wherein said conducting member is cylindrical so that said conducting member and said second pair of waveguide walls form a strip transmission line.

4. A frequency converter as set forth in claim 1, wherein said coaxial line couples said first and simultaneously said second radiofrequency wave to the said conducting member, and said waveguide extracts radiofrequency signals at the sideband frequency emerging from the said pair of semiconductor diodes.

5. A device as set forth in claim 1, wherein said coaxial line couples said first radiofrequency wave to the said conducting member, and said waveguide extracts radiofrequency signals generated by the said pair of semiconductor diodes at a harmonic frequency of the said first radiofrequency wave.

6. A microwave frequency converter comprising in combination; a rectangular waveguide through which a first radiofrequency wave may be propagated, said waveguide having first and second pairs of opposite walls, with said first pair of walls being narrower than said second pair of walls;

a first coaxial transmission line consisting of an inner end of an outer conductor;

a second coaxial transmission line consisting of an inner and of an outer conductor;

a mixing means consisting of a first, second, third and fourth semiconductor diode;

a power divider consisting of two branches of coaxial lines of essentially equal length and each branch comprising an inner conductor and an outer conductor;

a conducting member extending essentially halfway through the interior of said waveguide and joining the inner conductor of said first coaxial line through an aperture in the narrow wall of said waveguide; the outer conductor of said first coaxial line mounted upon and extending outwardly from the narrow wall of said waveguide, the said first and second semiconductor diodes being mounted on one side of the said conducting member, said third and fourth semiconductor diodes being mounted on the opposite side of the conducting member, said first semiconductor diode connecting the said conducting member with the inner conductor of one branch of the said power divider, said third semiconductor diode connecting the said conducting member with the inner conductor of the other branch of the said power divider, said outer conductors of the two branches of the power divider being connected to the said second pair of opposite waveguide walls, said second and said fourth semiconductor diode connecting the said conducting member with the said second pair of opposite waveguide walls, the inner and outer conductors of said power divider being joined and connected to the respective inner and outer conductors of the said second coaxial transmission line;

means applying a second radio frequency wave to said first coaxial transmission line, said first coaxial transmission line transmitting said second signals to said member;

and a further wave conducting means coupled to said second coaxial transmission line, said second coaxial transmission line coupling signals between said member and said further wave conducting means.

7. An image-rejection microwave frequency converter comprising in combination;

a rectangular waveguide through which a first radiofrequency wave may be propagated, said waveguide having first and second pairs of opposite walls, with said first pair of walls being narrower than said second pair of walls, said waveguide being terminated on one end with a shorting plate;

a first coaxial transmission line consisting of an inner conductor and of an outer conductor;

a second coaxial transmission line consisting of an inner conductor and of an outer conductor;

a mixing means consisting of a first, second, third and fourth semiconductor diode;

a first power divider consisting of a short branch of a coaxial line and of a long branch of a coaxial line, the difference in length between the two branches being such that 90° electric phase differential is introduced between the two branches, each branch consisting of an inner conductor and of an outer conductor;

a second power divider consisting of a short branch of a coaxial line and of a long branch of a coaxial line, the difference in length between the two branches being such that 90° electric phase differential is introduced between the two branches, each branch consisting of an inner conductor and of an outer conductor;

a first conducting member, said member extending essentially halfway through the interior of the said waveguide and joining the inner conductor of the said long branch of the first power divider through an aperture in the narrow wall of the said waveguide;

a second conducting member, said member extending essentially halfway through the interior of the said waveguide and joining the inner conductor of the said short branch of the first power divider through an aperture in the narrow wall of the said waveguide;

the said first and second conducting members being essentially in line and separated from each other by a narrow gap, the said first conducting member being connected to the said inner conductor of the long branch of the said second power divider through an aperture in the said shorting plate of the said waveguide, the said second conducting member being connected to the said inner conductor of the short branch of the said second power divider through an other aperture in the said shorting plate of the said waveguide, the said first and second semiconductor diode being mounted on opposite sides of the first conducting member and electrically coupled between said opposite sides of said first member and respective ones of said second pair of waveguide walls, the said third and fourth semiconductor diode being mounted on opposite sides of the second conducting member and electrically coupled between said opposite sides of said second member and respective ones of said second pair of waveguide walls, the inner and outer conductors of the two branches of the first power divider branching off from the respective inner and outer conductor of the said first coaxial transmission line, the inner and outer conductor of the two branches of the second power divider branching off from the respective inner and outer conductor of the said second coaxial transmission line;

means applying a second radiofrequency wave to the said first coaxial transmission line;

and a further wave conducting means coupled to said second coaxial transmission line coupling signals between said second power divider and said further wave conducting means.

* * * * *